Nov. 25, 1941.　　A. R. KEMP ET AL　　2,263,993
PREPARATION OF PURIFIED RUBBER AND RUBBER-LIKE MATERIALS
Filed April 7, 1938　　2 Sheets—Sheet 2
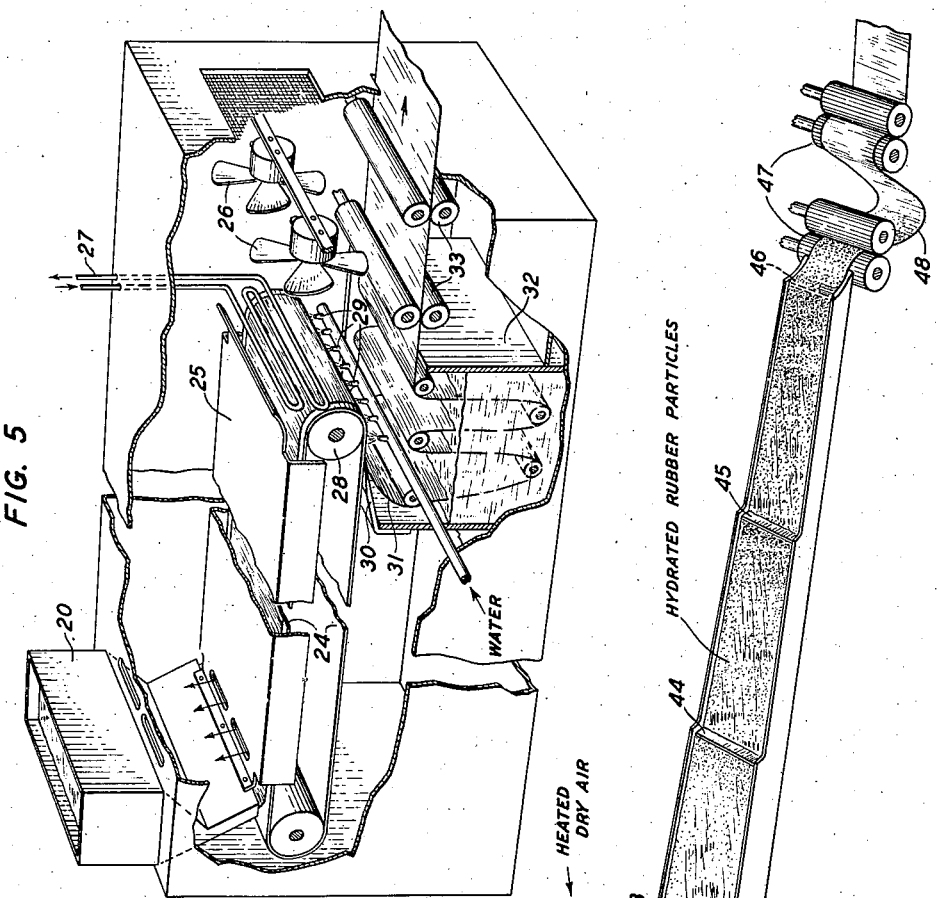
FIG. 5
FIG. 6
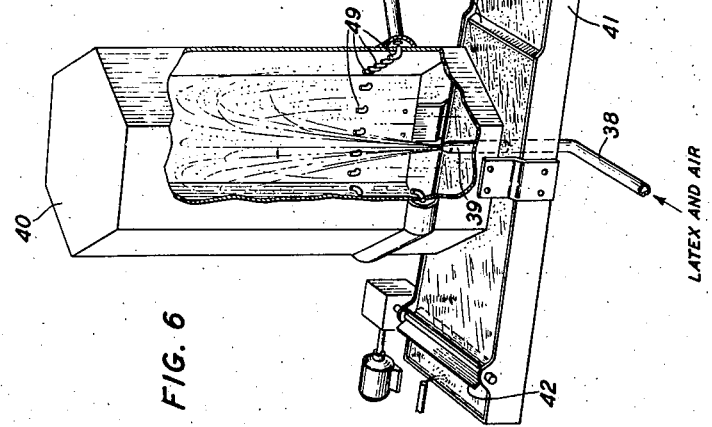
INVENTORS: A. R. KEMP
H. PETERS
BY
B. H. Jackson
ATTORNEY Patented Nov. 25, 1941

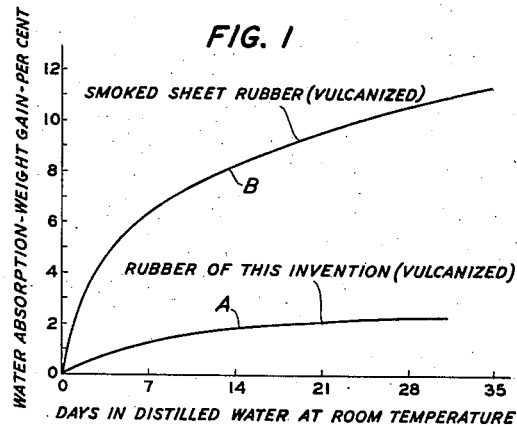
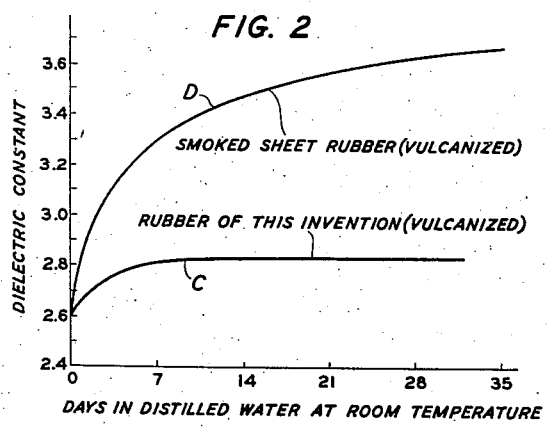
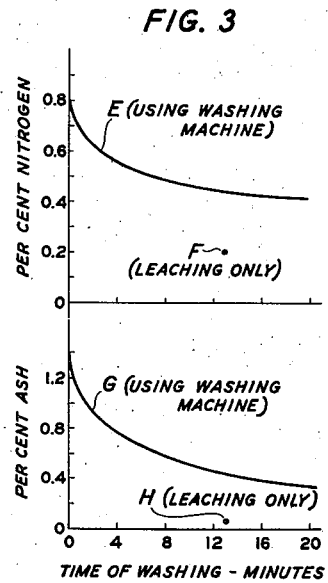
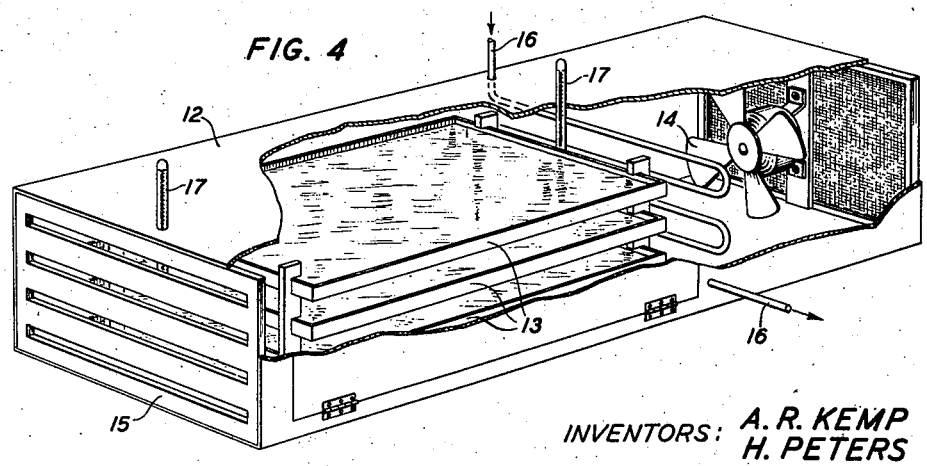
INVENTORS: A. R. KEMP
H. PETERS

2,263,993

UNITED STATES PATENT OFFICE 2,263,993

PREPARATION OF PURIFIED RUBBER AND RUBBER-LIKE MATERIALS

Archie R. Kemp, Westwood, N. J., and Henry Peters, New York, N. Y., assignors to Bell Telephone Laboratories, Incorporated, New York, N. Y., a corporation of New York Application April 7, 1938, Serial No. 200,672
In Great Britain September 28, 1937

5 Claims. (Cl. 260—817)

This invention relates to methods for the preparation of purified rubber or rubber-like material, and has for an object the substantially complete removal of the water-soluble matter which is present in latex, such as rubber latex.

Present plantation practice in the treatment of rubber latex involves adding to the latex in its original or diluted form a coagulant such as acetic or formic acid following which the rubber is sheeted between washing rolls and subsequently dried in sheds or in a smoke chamber to make crepe or smoked sheet rubber, which are the standards of crude rubber available on the market.

For many purposes this type of commercial crude rubber is objectionable in that it is not a uniform product and contains a substantial and variable amount of water-soluble matter and dirt which deleteriously affect the physical and electrical properties of the rubber in either the vulcanized or unvulcanized state, particularly when intended for use under humid conditions. The non-uniform composition of this rubber also results in wide variations in its vulcanizing characteristics.

Various attempts have been heretofore made to remove the water-soluble matter from crude rubber. For example, British Patent 223,644 proposes a thorough washing of acid coagulated rubber by passing the rubber through washing rolls to produce a thin crepe, followed by prolonged soaking in water and accompanied by a recreping of the rubber, whereby the amount of water-soluble matter in the crepe rubber is substantially reduced but not entirely eliminated. In the researches involved in the present invention, it was discovered that the present commercially used processes of coagulating rubber latex by acid or heating to an elevated temperature serve to entrap a substantial amount of the naturally occurring water-soluble substances within the rubber which cannot be later removed even under optimum washing conditions. It was also found that mechanical washing is ineffective irrespective of what process is employed to coagulate the latex.

In accordance with this invention as applied to rubber, it is proposed to remove the water-soluble matter from rubber by a process comprising the following steps:

(1) Drying a film or a spray of rubber latex at a suitable temperature preferably not in excess of 50° C. until the rubber is in solid form and has only a small moisture content;

(2) Subjecting the partially dried rubber film or powder to the leaching effect of substantially pure water at a suitable temperature preferably not exceeding 50° C. for a time sufficient to reduce the water-soluble matter therein to the desired extent, care being taken to avoid any mastication of the rubber until after the removal of the water-soluble matter; and (3) Drying the purified rubber film or powder in any suitable manner.

Samples of rubber film prepared by the above process have been found to have an ash content of less than 0.05 per cent and frequently less than 0.02 per cent, indicating the high degree to which the water-soluble matter has been removed.

Referring to the attached drawings:

Fig. 1 illustrates by means of curves the amount of water absorption obtained from rubber purified by this invention and rubber prepared from the usual smoked sheet rubber, both of which were vulcanized in the usual manner;

Fig. 2 compares by means of curves the dielectric constant of the two types of rubber of Fig. 1 for various times of immersion in water;

Fig. 3 compares the nitrogen and ash content of rubber washed by leaching and rubber washed with mechanical washing on a roll-type rubber washing machine;

Fig. 4 illustrates one form of apparatus for carrying out the process of this invention;

Fig. 5 illustrates how a continuous sheet of latex may be formed and treated by the process of this invention; and Fig. 6 illustrates apparatus for spraying the latex and treating the sprayed latex in accordance with this invention.

The rubber latex to be treated by this invention may have a low or high concentration of rubber due to dilution, centrifuging, creaming, or evaporation; it may have a hydrogen ion (pH) concentration ranging from about 5 to 12; and if desired there may be added to the latex non-coagulating stabilizers other than ammonia.

A suitable procedure for carrying out the process of this invention involves pouring the latex into shallow trays or pans to a depth sufficient that when it is substantially dry the resulting rubber film has a thickness preferably less than 0.035 inch. The evaporation of the water from the latex may be accelerated by passing dry air over the pans, the temperature of the circulating air being such that the latex is maintained during evaporation at a temperature preferably less than 40° C. as will appear hereinafter. If desired the drying of the latex may be carried on in a partial vacuum. As soon as the water content of the rubber has been reduced to about 15 per cent of the total solids, the rubber sheets are in a solid irreversible form and may be easily removed from the pans when immersed in water for a short period. After removal from the pans the sheets are leached by immersion in substantially pure water, preferably maintained at a temperature less than 50° C. During leaching, the leaching water may be stirred if desired. However, it is important to avoid any mastication of the rubber sheets until the water-soluble matter has been leached out. Films produced in this manner will lose substantially all their water-soluble matter after they have been immersed in the water for only a short time, a time of less than fifteen minutes generally being sufficient for films not thicker than 0.010 inch, which have been dried at about 25° C. and leached at about 25° C. A somewhat longer time will be needed for thicker films or lower temperatures of drying and leaching. After the immersion of the films in the washing water for the required time the films may then be removed, dried in any suitable manner and packed for shipment.

Tests made during the development of this invention have shown that coagulating the latex with acids or by heating the latex to an elevated temperature, prevents the subsequent complete removal of the water-soluble matter from the rubber so treated. Also, the washing of dried latex film with dilute acetic or hydrochloric acid instead of substantially pure water prevents the complete removal of the water-soluble matter. On the other hand, leaching with dilute ammonia appears to assist in the removal of salts and removes some of the protein which is not removed when water is used for leaching. These tests indicate that rubber latex contains a substance which after coagulation with acid or heat at an elevated temperature becomes solidified and entraps the water-soluble substances. It is, therefore, an important feature of this invention to avoid heating the latex to an elevated temperature or adding acid to the latex prior to the removal of the water-soluble matter. The washing process of this invention also preferably avoids mechanical working or mastication of the rubber prior to or during removal of the water-soluble matter. For example, tests were made on two sheets of latex film dried at 25° C. which contained prior to washing 0.80 per cent nitrogen and 1.32 per cent ash. One sample was masticated on rolls during washing and after a twenty minute washing period it had a nitrogen content of 0.42 per cent and an ash content of 0.33 per cent. The other sample after simple immersion in water for thirteen minutes without mastication had a nitrogen content of 0.20 per cent and an ash content of 0.02 per cent. It is seen therefore that mastication of the rubber prior to or during washing is objectionable in that it serves to entrap part of the water-soluble matter that could otherwise be removed.

The importance of temperature and the leaching time in the process of this invention are illustrated by the following tables A and B which give data obtained by drying rubber latex at various temperatures to form films having a thickness of 8 mils and subsequently immersing the dried films in distilled water at various temperatures and for various periods of time, after which each film was dried again and its weight compared with its weight prior to the leaching step, the difference between the two weights divided by its weight prior to leaching giving the percentage of water-soluble matter removed. All films tested were derived from the same batch of latex and, therefore, each film before test contained the same amount of water-soluble matter. In each case the leaching was performed immediately after the formation of the dried latex film and no mechanical working of any sort was performed on the rubber prior to the completion of the leaching step. The maximum amount of water-soluble matter extracted from this particular latex under optimum conditions was about 7.30 per cent and checking by other laboratory tests showed that when about 7.30 per cent of water-soluble matter was extracted from this particular latex no appreciable quantity of water-soluble matter remained in the rubber. The probable error involved in the determination of the water soluble matter was approximately ±0.2 per cent.

Table A

| Temperature at which latex was dried prior to leaching | Amount of water-soluble matter extracted at a leaching temperature of 25° C. for the leaching periods indicated | | | |
| --- | --- | --- | --- | --- |
| | 15 min. | 1 hour | 3 hours | 24 hours |
| | Percent | Percent | Percent | Percent |
| 25° C | 7.26 | 7.20 | 7.30 | 7.11 |
| 30° C | 7.15 | 7.09 | 7.31 | 7.04 |
| 40° C | 6.78 | 7.08 | 7.21 | 7.00 |
| 50° C | 6.24 | 6.51 | 6.62 | 6.57 |
| 60° C | 4.00 | 6.24 | 6.32 | 6.30 |
| 80° C | 3.27 | 3.80 | 5.31 | 5.60 |
| 90° C | 3.00 | 3.62 | 4.99 | 5.40 |

Summarizing the data of Table A it will be apparent that the drying temperature for the liquid latex should preferably be below 50° C. if one wishes to remove substantially all the water-soluble matter but that higher drying temperatures may be employed if it is not objectionable to retain in the rubber a small amount of water-soluble matter. Although drying the latex at a temperature in the neighborhood of 25° C. gives very satisfactory results it is possible that occasionally a higher drying temperature will be preferred in order to shorten the time required to evaporate the film to a solid irreversible state.

Table B

| Temperature of extraction water | Amount of water-soluble matter extracted for the leaching periods indicated | | | |
| --- | --- | --- | --- | --- |
| | 15 min. | 1 hour | 3 hours | 24 hours |
| | Percent | Percent | Percent | Percent |
| 4° C | 6.49 | 7.09 | 7.16 | 7.18 |
| 25° C | 7.26 | 7.20 | 7.30 | 7.11 |
| 40° C | 6.80 | | | |
| 50° C | 6.40 | 6.94 | 6.68 | 6.82 |
| 70° C | 6.10 | 6.39 | | *6.78 |
| 86° C | 4.44 | 4.70 | 5.00 | **5.21 |
| 93° C | 3.24 | | | |
| 100° C | 2.80 | 3.00 | *3.25 | |

*Sticky.
**Sticky and extracted only seven hours.

For Table B the latex was evaporated to dryness at 25° C. to form rubber films of a thickness of 8 mils and the films were then immersed in distilled water maintained at the various temperatures indicated in the first column, the amount of water-soluble matter extracted being given under the columns headed by the various times of immersion in the leaching water.

Summarizing Table B, the extraction water should preferably be maintained at a temperature not in excess of 50° C. if one wishes to remove substantially all of the water-soluble matter, but that higher temperatures may be employed if it will be satisfactory to allow a small amount of the water-soluble matter to remain in the rubber. However, if complete removal of the water-soluble matter is desired the leaching temperature should be lower than 50° C.

Although the above Tables A and B show a maximum extraction time of twenty-four hours it has not been thought necessary to include data for longer periods since for an 8 mil film dried and extracted at the lower temperatures an increase in the leaching time beyond twenty-four hours will not give any appreciable increase in the amount of water-soluble matter extracted over the values given for the shorter periods.

In considering the above data it must be emphasized that the values given are for a dried rubber film having a thickness of 8 mils. If rubber films are employed having a greater thickness than 8 mils the preferred drying temperatures and the preferred leaching water temperatures would be the same as those for an 8 mil film except that for thicker films it is necessary to prolong the leaching period in order to obtain a complete removal of the water-soluble matter. Thus, the results indicated above for an 8 mil film with a leaching time of about fifteen minutes would be duplicated for a film of a thickness of 30 mils providing the leaching time were prolonged for a period of thirty to forty-five minutes. If creamed or concentrated latex is used films thicker than 35 mils can be dried in which case the leaching time should be prolonged for several hours in order to remove the water-soluble matter.

As previously stated, the above results were obtained by leaching the rubber films immediately after their formation by evaporating the liquid latex to dryness. If there is a delay of more than a few hours between the formation of the dried rubber film and its leaching the rubber film will be altered to a condition where it will be more difficult to remove the water-soluble matter.

Several samples of rubber sheets prepared by drying at 25° C. latex into 8 mil films, immersing the films in water at 25° C. for fifteen minutes and subsequently drying the films, were tested for nitrogen, ash and resin (acetone extract) content with the following average results: nitrogen 0.28 per cent; ash 0.01 per cent; resin 2.51 per cent. If the above films had been leached in water that was slightly alkaline the nitrogen content would have been somewhat less, for example 0.15 per cent or a little higher. On the other hand deproteinized rubber (rubber treated to reduce its nitrogen content to less than 0.15 per cent nitrogen) may have a nitrogen content of 0.05 per cent; an ash content of 0.06 per cent; and a resin content of 2.76 per cent. Good quality plantation rubber not treated in accordance with this invention has a nitrogen content ranging from about 0.26 to 0.4 per cent and an ash content ranging from about 0.2 to 0.4 per cent. These figures on relative ash content illustrate the value of employing the process of this invention in securing the complete removal of the water-soluble matter.

Rubber prepared by the process of this invention has many points of superiority over the usual plantation rubber as now supplied. Some of these advantages may be summarized as follows:

(1) Uniformity of composition which is obtained by uniform processing;

(2) This uniformity in composition will result in uniformity of vulcanization and uniformity in the resulting product, both of which are not true of usual plantation rubber which may vary as much as 300 per cent in rate of cure, and as much as 50 per cent in physical properties upon vulcanization;

(3) Water absorption of the rubber made by the present invention is equally as low as deproteinized rubber and is substantially lower than plantation rubber;

(4) The dielectric stability of this new rubber product when immersed in distilled water is substantially equal to deproteinized rubber and distinctly superior to plantation rubber;

(5) The rubber of this invention is particularly advantageous as compared to deproteinized rubber in aging and physical properties. Deproteinized rubber is somewhat soft and is difficult to vulcanize to a high modulus and ages poorly; whereas the rubber of this invention has vulcanizing characteristics equal to the best plantation rubber;

(6) The rubber of this invention is practically odorless and of light color and is superior to plantation rubber in these respects;

(7) The rubber of this invention is not susceptible to moldiness and, therefore, it will generally not be necessary to add preservatives or to smoke it as is done in present plantation practice; and (8) In the presence of certain accelerators such as tetramethyl-thiuram-monosulphide, the rate of vulcanization of the purified rubber of this invention is considerably faster than smoked sheet or crepe rubber and somewhat faster than deproteinized rubber, and in this respect is the equivalent of the best plantation rubber.

In the following Table C certain physical characteristics of the rubber of this invention are compared with high quality deproteinized rubber, thin pale crepe and selected smoked sheet rubber:

*Table C*

| Number of minutes of vulcanization at 142° C. | Ultimate tensile strength in pounds per sq. inch | Ultimate elongation, per cent | Modulus—loads in pounds per square inch at various elongations | | | |
|---|---|---|---|---|---|---|
| | | | 400% | 500% | 600% | 700% |
| DEPROTEINIZED RUBBER | | | | | | |
| 8 | 1,567 | 956 | 25 | 75 | 150 | 283 |
| 10 | 2,500 | 783 | 225 | 275 | 525 | 1,450 |
| 12 | 2,287 | 760 | 225 | 325 | 533 | 1,387 |
| 14 | 2,275 | 750 | 208 | 308 | 525 | 1,225 |
| RUBBER OF THIS INVENTION (FREE OF WATER-SOLUBLE MATTER) | | | | | | |
| 6 | 2,275 | 873 | 100 | 175 | 325 | 650 |
| 7 | 2,967 | 783 | 233 | 375 | 800 | 1,792 |
| 8 | 3,025 | 760 | 300 | 450 | 908 | 2,075 |
| 9 | 2,950 | 733 | 325 | 475 | 1,117 | 2,533 |
| 10 | 2,850 | 730 | 312 | 450 | 1,025 | 2,300 |
| 12 | 2,683 | 753 | 275 | 417 | 825 | 1,925 |
| THIN PALE CREPE (1ST GRADE) | | | | | | |
| 10 | 1,767 | 833 | 58 | 150 | 283 | 600 |
| 12 | 3,200 | 747 | 300 | 550 | 1,367 | 2,650 |
| 14 | 3,025 | 723 | 300 | 575 | 1,383 | 2,667 |
| 16 | 2,933 | 747 | 325 | 500 | 1,067 | 2,416 |
| SELECTED SMOKED SHEET | | | | | | |
| 10 | 2,042 | 803 | 150 | 250 | 533 | 1,187 |
| 12 | 2,858 | 727 | 325 | 575 | 1,233 | 2,525 |
| 14 | 2,958 | 733 | 350 | 617 | 1,300 | 2,550 |

For Table C the compositions tested were identical except for the noted difference in the kind of rubber employed. In each case the tested composition comprised by weight 100 parts rubber, 3 parts zinc oxide, 2.50 parts sulphur and 0.50 part of tetramethyl-thiuram-monosulphide. The composition just specified is a typical one and gives a legitimate basis for comparing the properties of the various rubbers. The deproteinized rubber employed for these tests had a nitrogen content of 0.05 per cent, an ash content of 0.06 per cent and an acetone extract of 2.76 per cent. The rubber of this invention for Table C had a nitrogen content of 0.20 per cent, an ash content of 0.04 per cent and an acetone extract of 2.35 per cent.

The values given in Table C show that the rubber of this invention with respect to its ultimate tensile strength and modulus at various loads is definitely superior to deproteinized rubber and is fully the equivalent of crepe or selected smoked sheet rubber.

Rubber prepared by the process of this invention is generally somewhat tougher than usual plantation rubber and hence may be more difficult to plasticize or break down in a rubber mill. It may, therefore, be desirable to aid the breakdown of the rubber by adding to the rubber latex before evaporation a small amount of naphthyl-beta-mercaptan or some other oxidation catalyst.

The process of the present invention is not primarily concerned with the removal of any of the rubber protein since it has been found that the presence of the rubber protein is very desirable in aiding vulcanization and improving aging. However, it may be desired to remove a substantial amount of the protein as for thermoplastic submarine cable insulation, in which case, the above described process may be modified by making slightly alkaline the water used in the leaching process, for example, by the addition of about 0.5 per cent ammonia.

The presence of a small amount of protein in the rubber but with the water-soluble matter removed in accordance with this invention results in a rubber which has certain advantages over deproteinized rubber, particularly if it is to be vulcanized and used freely exposed to air or immersed in water and exposed to air, since deproteinized rubber is more or less unstable under these conditions. It has been found that the protein without the water-soluble matter has only a very small effect on the electrical properties of the rubber. The presence of a small amount of the protein preserves the rubber because the protein apparently forms films around the rubber particles and the protein, therefore, acts as a protecting material; the presence of the protein aids vulcanization and gives increased strength and stiffness to the vulcanized rubber.

Since the water absorption of rubber is largely a function of the amount of water-soluble matter present in the rubber it follows that rubber prepared by the process of this invention reduces water absorption to a very low value. Fig. 1 compares the water absorbing properties of two sheets (20 mil thickness) of vulcanized rubber where for curve A the rubber before vulcanization was treated in accordance with this invention, that is, with the latex dried at 25° C. into a 20 mil sheet, and then washed free of water-soluble matter by immersion in distilled water at a temperature of 25° C.; while for curve B the rubber employed was good quality smoked sheet rubber not treated in accordance with this invention. For each sheet the composition by weight was the same as that given under Table C and in each case the time of vulcanization was seven minutes at 142° C. It will be noted from curve A that after immersion in distilled water for thirty days, the vulcanized rubber treated in accordance with this invention increased in weight due to water absorption only about 2.3 per cent, while as shown by curve B the smoked sheet rubber for the same time of immersion increased in weight about 10.7 per cent. For these curves it will be noted that the days of immersion in the distilled water at room temperature are plotted against the percentage of gain in weight due to water absorption.

According to a standard test for determining the water absorption of unvulcanized rubber, the rubber is milled 10 minutes on a warm mill and then pressed between Cellophane sheets in a mold at 105° C. to form a rubber sheet of a thickness of 0.027 inch, the Cellophane sheets being removed after the rubber sheet has cooled. Samples of the rubber of this invention, after being prepared for test in the above manner, increased in weight less than 4 per cent after immersion for 168 hours in distilled water at 25° C.; and for certain samples of the rubber of this invention the amount of water absorption for the said period of immersion was less than 2.5 per cent. The values of water absorption just given are for unvulcanized rubber while the water absorption values plotted in Fig. 1 are for vulcanized rubber.

The dielectric constants of the two sheets of rubber of Fig. 1 are compared in the curves of Fig. 2 where the dielectric constant is plotted against days of immersion in distilled water at room temperature. Curve C shows that after about fourteen days of immersion the dielectric constant of the rubber treated by this invention become substantially constant at a value of 2.83 while as shown by curve D the smoked sheet rubber after fourteen days of immersion had a dielectric constant of 3.47 with its dielectric constant increasing with further immersion until after thirty-five days its dielectric constant was 3.66. Before immersion both vulcanized sheets in dried form had a dielectric constant of 2.59.

The data plotted as Fig. 3 illustrate graphically the importance of avoiding mastication of the film rubber during the washing step when it is desired to obtain minimum values of nitrogen and ash content. In the upper part of this figure curve E is a plat of the nitrogen content of the rubber obtained from latex evaporated to dryness at 25° C. and the resulting thin rubber film then washed for various periods of time in a standard corrugated washing machine, with the time of washing plotted in minutes along the horizontal axis and percentage of nitrogen along the vertical axis. Curve E shows that prior to the washing the latex film had a nitrogen content of 0.8 per cent and that the nitrogen content was reduced to about 0.42 per cent after being washed in the machine for twenty minutes. A corresponding dried latex film having initially a nitrogen content of 0.8 per cent instead of being washed in the washing machine was simply immersed in distilled water at a temperature of 25° C. for thirteen minutes, and as a result of this leaching it was found to have a nitrogen content of 0.20 per cent as indicated by the dot F of the figure.

Similarly, curve G shows the percentage of ash content obtained from rubber latex dried at 25° C. and subsequently washed for various periods of time on a standard corrugated washing machine, the time of washing in minutes being plotted along the horizontal axis and the percentage of ash content being plotted along the vertical axis. As shown by curve G the latex film originally had an ash content of about 1.32 per cent which after washing in the machine for twenty minutes was reduced to an ash content of about 0.33 per cent. A similar latex film evaporated to dryness and initially having an ash content of 1.32 per cent was immersed in distilled water at 25° C. for thirteen minutes without any mechanical working of the film, as the result of which its ash content was reduced to about 0.02 per cent as shown by the dot H on the figure. All the data for Fig. 3 were obtained from a rubber film having a thickness of 8 mils.

The rubber prepared by this invention is adapted for general use in the rubber industry either in a vulcanized or unvulcanized form, such as for automobile tires or for the insulation of electrical conductors.

The rubber of this invention has electrical properties substantially equal to those described for deproteinized rubber in British Patent 307,966. When all of the water-soluble matter is removed from rubber the effect of the protein upon the dielectric properties of the rubber is made almost negligible. As previously stated the protein content of rubber treated by the process of this invention may be reduced by leaching the rubber films in water containing 0.5 per cent ammonia. The rubber of this invention is, therefore, adapted for use as submarine cable insulation and, for example, may be substituted for the deproteinized rubber content of the insulation compounds described in British Patent 307,966. Thus the contemplated submarine cable insulation may comprise rubber free of water-soluble matter, gutta percha, deresinated balata and refined montan wax in various percentages including those described in the said patent. For example, a suitable composition for submarine cable insulation comprises 50 per cent deresinated balata or gutta percha, 10 per cent hydrocarbon wax and 40 per cent rubber treated in accordance with this invention.

It also should be borne in mind that the vulcanized rubber of this invention is more stable electrically when immersed in aerated water than is the case with deproteinized rubber that is vulcanized. The vulcanized rubber of this invention is therefore of prime importance for the insulation of electrical conductors to be buried in the earth or for other uses when the insulation will be subject to both air and moisture. Thus the rubber of this invention plus a vulcanizing agent with other compounding ingredients as required may be extruded on the wire or cable and then vulcanized, the extrusion and the vulcanization being carried on as a continuous process if desired. As an alternative process the conductor may be thinly coated with liquid latex into which has been dispersed curing ingredients that are water-insoluble. The latex may then be dried on the conductor at a temperature of 40° C. or less, subsequently immersed in water at 50° C. or less to remove the water-soluble matter and then redried in any suitable manner, after which the rubber sheath may be vulcanized. If it is not desired to vulcanize this layer of rubber on the conductor the curing ingredients should, of course, be omitted from the latex. By the above described process the conductor is surrounded by a thin layer of rubber which has highly desirable insulating and physical properties. The remaining thickness of insulation desired on the conductor can be subsequently built up by extruding over the purified rubber-coated conductor an additional purified rubber composition containing vulcanizing ingredients to permit vulcanization after extrusion.

As another example where this invention may be advantageously used, it is frequently important to have fabrics impregnated with rubber having good physical and low moisture absorbing properties along with a pleasing odor. This can be accomplished by impregnating the fabric with latex to the desired thickness, drying the latex at the preferred temperature in the neighborhood of 25° C., removing the water-soluble matter by immersion in water at 50° C. or less, and subsequently drying the purified rubber in any suitable manner. The purified rubber of this invention is practically odorless. If the vulcanization of the rubber in the fabric is desired the latex with which the fabric is impregnated may contain water-insoluble curing ingredients or the rubber may be vapor cured.

The use of the rubber of this invention in the manufacture of rubber goods such as automobile tires is advantageous since each lot of rubber made in accordance with this invention will vulcanize like every other lot, thereby eliminating costly blending operations now necessary when plantation rubber is used.

It will be noted from the data of Tables A and B that the invention is particularly adapted to be employed as a continuous process in that the preferred temperature of the latex during evaporation, the preferred temperature of the leaching water and the minimum time of immersion in the leaching water are values readily realized in practice. Figs. 4, 5 and 6 disclose representative apparatus that may be employed in carrying out the process of this invention.

Referring to Fig. 4 the housing 12 contains racks for supporting a plurality of shallow trays 13 stacked in a manner to permit the free circulation of air between and around the trays 13 holding the latex. A fan 14 serves to drive dry air between the trays 13 and out of the housing at end 15. The air before reaching the trays 13 passes between the coils of a pipe 16 containing either a cooling or a heating fluid to bring the air to the proper temperature that will maintain the latex in pans 13 at approximately 25° C. during evaporation. Thermometers 17 may be provided for assisting in determining the proper air temperature. After the latex has been evaporated to substantial dryness the trays 13 may be removed from the housing, the rubber films stripped from the trays and the films immersed in washing water at the proper temperature to remove the water-soluble matter.

Figure 5 illustrates other apparatus by means of which the process of this invention may be carried on as a continuous process. The non-coagulated liquid latex is poured into a hopper 20 which has a narrow elongated outlet opening which serves to spread the liquid latex upon an endless belt or carrier 24 in the form of a uniform thin coating. Means not shown is provided to move the belt at the proper rate of speed with the upper half of the belt moving from left to right in the figure. The upper half of the belt is enclosed in a partial housing 25 and dry air is forced through this housing in a direction opposite to the direction of belt travel, the temperature of the air being suitably controlled to maintain the latex on the belt at approximately 25° C. For this purpose fans 26 are shown for driving the air into housing 25 after it has passed between the coils of a pipe 27 containing a suitable cooling or heating fluid to bring the air to the proper temperature. The speed of travel of the belt 24 is such that the latex becomes substantially dry by the time it reaches drum 28 and after the solid rubber film passes around drum 28 the film is sprayed with water by nozzles 29 to facilitate stripping the rubber film from the belt by stripper 30. The stripped rubber sheet 31 is then directed into a tank 32 containing substantially pure water, where the sheet remains immersed for the time required to secure the complete removal of the water-soluble matter, after which the sheet is passed through suitable drying rollers 33 whereupon it is ready to be cut up and packed for shipment. It is, of course, contemplated that the water in tank 32 will be frequently or continuously changed or renewed.

Still other apparatus for carrying out this invention is disclosed in Fig. 6 where the latex mixed with air is passed through a pipe 38 under a pressure to a jet 39 which serves to atomize and aerate the latex, the sprayed latex being under sufficient pressure to rise to a height of, say, 20 to 30 feet within the tower 40 so that the rubber particles are in a rigid and substantially dry state by the time they fall into the shallow trough 41 containing water. The water in the portion of the trough 41 beneath tower 40 need not be more than a few inches deep as long as the water is kept moving by a suitable agitator 42. The water in passing under tower 40 receives the rubber particles, and the water with the rubber particles floating thereon passes over a series of dams 43 to 46, the time taken for the rubber particles to travel from beneath tower 40 to dam 46 being, say 15 to 30 minutes or whatever time is necessary to permit the water-soluble matter to be completely extracted from the sprayed rubber particles. The sprayed particles after passing over dam 46 are directed into the nip of one or more creping machines 47 to cause the rubber particles to coalesce into the form of a continuous rubber sheet 48 whereupon the sheet may be dried, cut up and packed for shipment.

The water in trough 41 is suitably controlled as to temperature to remain substantially constant at 25° C. and dry air at a controlled temperature by means of a series of nozzles 49 is directed upwardly against the falling rubber particles to maintain the sprayed particles at a temperature of about 25° C. The apparatus of Fig. 6 as well as the apparatus of Figs. 4 and 5 preferably should be used in a suitable building to protect the latex from the sun and rain.

While the process of this invention has been described above in connection with the treatment of natural rubber latex, the invention may also be applied to an artificial latex of rubber, or to a latex of a synthetic rubber-like material, or to a natural latex of a rubber-like material such as gutta percha or balata.

What is claimed is:

1. The method of preparing rubber substantially free of water-soluble matter while retaining a substantial amount of the protein of the rubber, which method comprises forming a thin film of latex free of foreign coagulating agents, drying said film at a temperature not in excess of 40° C. to produce a dried film having a thickness less than 35 mils, and promptly immersing said film in water at a temperature not in excess of 40° C. for a time sufficient to remove substantially all the water-soluble matter from the film while maintaining the surfaces of said film in substantially their original state both prior to and during said immersion.

2. The method of preparing rubber substantially free of water-soluble matter while retaining a substantial amount of the protein of the rubber, which method comprises forming latex free of foreign coagulating agents into a form having a large surface area compared to its volume, such as a thin film or sprayed particles of liquid latex, drying the latex at a temperature in the neighborhood of 25° C. until the latex is changed to solid rubber and within a few hours thereafter leaching the rubber in substantially pure water at a temperature in the neighborhood of 25° C. while maintaining the surfaces of the rubber in substantially their original state both prior to and during said leaching.

3. The method of preparing rubber from latex which comprises advancing a quantity of latex, free of foreign coagulating agents, in the form of a continuous film through a zone maintained at a temperature not exceeding about 50° C., directing a current of air through said zone in a direction opposite to the movement of said film, whereby said film is dried to a solid state, and after leaving said zone immersing the dried film in water at a temperature of less than 50° C. for a time sufficient to remove the water-soluble matter.

4. The method of preparing rubber from latex which comprises spraying the latex into fine particles, substantially drying the spray while the particles are maintained at a temperature of less than 50° C., washing the dried particles in water at a temperature of less than 50° C. to remove the water-soluble matter, and subsequently redrying the washed rubber.

5. The method of preparing rubber substantially free of water-soluble matter while retaining a substantial amount of the protein of the rubber, which method comprises forming latex free of foreign coagulating agents into a form having a relatively large surface area compared to its volume, drying the latex while it is maintained at a temperature not in excess of about 50° C. until the latex is changed to solid rubber and immersing the dried latex in water at a temperature not exceeding about 50° C. for a time sufficient to remove the water-soluble matter while maintaining the surfaces of the rubber in substantially their original state prior to and during immersion.

ARCHIE R. KEMP.
HENRY PETERS.